United States Patent
Goldstein et al.

(10) Patent No.: US 6,436,539 B1
(45) Date of Patent: Aug. 20, 2002

(54) CORROSION-RESISTANT ZINC ALLOY POWDER AND METHOD OF MANUFACTURING

(75) Inventors: Jonathan R. Goldstein, Jerusalem; Inna Gektin, Givat Zeev, both of (IL)

(73) Assignee: Electric Fuel Ltd., Jerusalem (IL)

( * ) Notice: Subject to any disclaimer, the term of this patent is extended or adjusted under 35 U.S.C. 154(b) by 0 days.

(21) Appl. No.: 09/131,803

(22) Filed: Aug. 10, 1998

(51) Int. Cl.$^7$ .............................................. C22C 18/00
(52) U.S. Cl. ........................... 428/407; 75/255; 420/513
(58) Field of Search .................... 75/252, 255; 148/441; 420/513, 524; 428/407

(56) References Cited

U.S. PATENT DOCUMENTS

| | | | |
|---|---|---|---|
| 3,623,911 A | 11/1971 | Oswin | 136/83 |
| 3,764,389 A | 10/1973 | Hsia | 136/311 |
| 3,945,849 A | 3/1976 | Hoffman | 136/107 |
| 4,084,047 A | 4/1978 | Himy et al. | 429/206 |
| 4,112,205 A | 9/1978 | Charkoudian et al. | 429/199 |
| 4,118,289 A | 10/1978 | Hsu | 204/435 |

(List continued on next page.)

FOREIGN PATENT DOCUMENTS

| | | | |
|---|---|---|---|
| EP | 0564.664 A1 | 10/1993 | |
| JP | 61-23707 | 2/1986 | |
| JP | 3-285261 | * 12/1991 | |
| SU | 463747 | 6/1975 | |

OTHER PUBLICATIONS

Moshtev, R. V. and Stoicheva, R., "Corrosion in alkali hydroxide solutions of electroytic zinc powder containing codeposited lead", *Journal of Applied Electrochemistry*, vol. 6, pp. 163–169.

Hampartzumian, K.L. and Moshtev, R. V., Effect of Lead on the Properties of Electrodeposited Primary Zinc Electrodes, Power Sources, Research and Development in Non–Mechanical Electrical Power Sources, Proceedings of the 7$^{th}$ International Symposium held at Brighton, Sep. 1970, Edited by D. H. Collins, pp. 495–510.

(List continued on next page.)

*Primary Examiner*—George Wyszomierski
(74) *Attorney, Agent, or Firm*—Lyon & Lyon LLP

(57) ABSTRACT

A method of producing a mercury-free corrosion resistant dendritic zinc alloy powder is provided. According to the method an electrolytic cell is prepared that contains an aqueous alkaline electrolyte with a preselected concentration of dissolved zinc cations and optionally the cations of one or more soluble inhibitor metals. The cell also contains a non-zinc adherent cathode, a first anode, and a second anode. The second anode comprises an inhibitor metal, the salts of which are only sparingly soluble in the alkaline electrolyte. For example, the second anode may comprise a minor anode of indium or bismuth interposed between the first or major anode and the cathode. A first voltage between the first anode and cathode is then applied to establish a desired cathode current density and the deposition of dendritic zinc and optional soluble inhibitor metals on the cathode. Concurrently a second voltage between the second anode and cathode is applied to establish a desired current density at the second anode and the simultaneous co-deposition of a desired concentration of the first inhibitor metal in the dendritic zinc being deposited on the cathode. Intermittently the deposited zinc alloy is removed from the cathode and homogenized into a plurality of dendritic zinc alloy particles. According to the method, mercury-free electrolytic zinc alloy powders with effective corrosion inhibiting concentrations of indium and/or bismuth either alone or in combination with other inhibitor metals can be produced. The corrosion resistant zinc alloy powders have a dendritic morphology that is advantageous for battery applications.

32 Claims, 5 Drawing Sheets

U.S. PATENT DOCUMENTS

| | | | |
|---|---|---|---|
| 4,195,120 A | 3/1980 | Rossler et al. | 429/50 |
| 4,957,826 A | 9/1990 | Cheiky | 429/27 |
| 5,039,576 A | 8/1991 | Wilson | 428/626 |
| 5,173,170 A | 12/1992 | Brown et al. | 205/96 |
| 5,206,096 A | 4/1993 | Goldstein et al. | 429/27 |
| 5,228,958 A | 7/1993 | Goldstein et al. | 204/115 |
| 5,232,798 A | 8/1993 | Goldstein et al. | 429/229 |
| 5,234,572 A | 8/1993 | Uchida et al. | 205/101 |
| 5,240,793 A * | 8/1993 | Glaeser | 420/513 |
| 5,312,476 A * | 5/1994 | Uemura et al. | 420/513 |
| 5,378,329 A | 1/1995 | Goldstein et al. | 204/115 |
| 5,419,987 A | 5/1995 | Goldstein et al. | 429/229 |
| 5,498,325 A | 3/1996 | Nishimura et al. | 205/96 |

OTHER PUBLICATIONS

English abstract of Yur'ev, B.P.; Golubkov, L.A.; and Grankin, L.S., *Electroytic Production of Pure and Complex Metal Powders*, Tr. Leningrand. Politekh Inst., No. 304, 102–5 (1970).

English abstract of SU 463747 (Jun. 13, 1975).

Patent Abstracts of Japan for JP 61023707, vol. 010174 (Jun. 19, 1986).

* cited by examiner

CORROSION-RESISTANT ZINC ALLOY POWDER AND METHOD OF MANUFACTURING

FIELD OF THE INVENTION

The present invention relates to corrosion resistant zinc powders and a method of manufacturing corrosion resistant zinc powders. More particularly, the present invention relates to high performance zinc alloy powders for use in the anodes of primary and secondary cells and batteries belonging to the zinc-alkaline family, such as zinc-manganese dioxide, silver-zinc, nickel-zinc, zinc-air and zinc-oxygen systems.

BACKGROUND OF THE INVENTION

Primary and secondary cells experience a loss of capacity on storing because of a self-discharge, parasitic, nonpower-producing reaction of the active electrodes. In particular, the shelf life of a cell employing a zinc electrode is limited by, among other factors, the open circuit and in-use corrosion of the zinc electrode, which causes discharge of the metallic zinc and evolution of hydrogen gas. Thus, in cells employing a zinc electrode, a central issue with respect to cell longevity is the zinc electrode's resistance to corrosion. Cell longevity is particularly important for zinc electrode batteries that require a long shelf life, for example a year or more, until they are consumed by the electronic application they are intended for.

Zinc anode corrosion is primarily the result of a reaction between the zinc and the aqueous electrolyte, which is commonly an alkaline solution of a Group IA metal hydroxide. One product of this reaction is hydrogen gas, the measurement of which is commonly used to gauge the level of zinc corrosion. The hydrogen gas forms at the cathodic sites of the anode by the decomposition of water. This hydrogen gas is particularly undesirable in sealed batteries where it can lead to bubble formation and excessive pressure build up. Simultaneous to the hydrogen gas generation, active zinc at the anodic sites of the anode oxidizes to zinc hydroxide, zinc oxide and mixtures of zinc hydroxide and zinc oxide. The zinc consumed in this reaction consequently becomes unavailable to produce an electric current, and thereby reduces the electrical capacity of the anode. The self-discharge reactions are as follows:

cathodic sites: $2H_2O+2e \rightarrow H_2\uparrow+2OH^-$

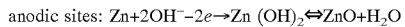
anodic sites: $Zn+2OH^--2e \rightarrow Zn(OH)_2 \Leftrightarrow ZnO+H_2O$

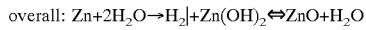
overall: $Zn+2H_2O \rightarrow H_2\uparrow+Zn(OH)_2 \Leftrightarrow ZnO+H_2O$ To avoid the corrosion of the zinc, a variety of corrosion inhibition techniques have been used. One of the oldest and most effective corrosion inhibition techniques involves the amalgamation of the zinc with mercury. Today, however, environmental policy and laws restrict use of mercury and its compounds as commercial corrosion inhibitors. Other effective techniques of reducing the corrosion reaction include adding corrosion inhibitors to the electrolyte or the zinc and alloying the zinc with an effective amount of a corrosion inhibitor. The challenge with respect to all methods of inhibiting corrosion is to achieve superior corrosion inhibiting performance without significantly sacrificing the zinc anode's discharge performance within the cell.

Several prior patents relate to the technique of using electrolyte additives to reduce corrosion in zinc anodes. In U.S. Pat. No. 4,112,205, a chloride double salt containing both mercuric ion and quaternary ammonium ion is added to the electrolyte to inhibit corrosion. The corrosion inhibitor provides a relatively continuous source of mercuric ion to the zinc as required to minimize corrosion of unamalgamated zinc as zinc oxide goes into solution and new zinc surfaces are exposed. Again for environmental policy reasons, corrosion inhibitors based on mercury and its salts are not practicable.

U.S. Pat. No. 3,945,849 teaches the use of quaternary ammonium salts as inhibitors for zinc anodes in primary battery cells. The patent teaches that the disclosed quaternary ammonium salts are particularly suitable for use as corrosion inhibitors in Leclanche-type cells wherein the electrolyte employed is ammonium chloride. As such, these corrosion inhibitors are not very effective in alkaline based battery cells in which an alkaline electrolyte comprised of an aqueous solution of a Group IA metal hydroxide is used.

U.S. Pat. No. 4,195,120 teaches alkaline cells containing a predominantly zinc anode and, as-a corrosion inhibitor, a surfactant which is an organic phosphate ester of the ethylene oxide-adduct type. The surfactant is added in such a manner that, directly or upon wetting of the anode with the electrolyte, there is adsorption of the surfactant on the surface of the anode material. The patent, however, teaches that the surfactant should be used in combination with a conventional zinc amalgam powder. This is unacceptable for environmental reasons. Moreover, because the inhibitor works as a surfactant, it tends to interfere with the electro-chemical reaction during discharge, which can degrade the electrical performance of the cell to an unacceptable level.

Because mercury is hazardous, research has been conducted on additional anode materials that are able to inhibit the generation of hydrogen in its absence. It has been found that zinc and lead, as well as indium, bismuth and/or gallium, combined in predetermined proportions can produce mercury-free zinc powders that provide effective corrosion resistance. A range of techniques have been investigated for treating zinc with these and other corrosion inhibitor metals to produce corrosion resistant zinc powders. Several commonly employed techniques include thermal atomization, cementation, and electrolytic co-deposition.

In the thermal atomization process, zinc alloy powder is produced using a method in which a predetermined amount of lead or other inhibitor metal is added to high-purity zinc, which is typically produced by an electrolytic method, the entire mixture is then melted to form an alloy. The molten alloy is then atomized through an air jet to form a powder comprised of generally spheroidal or dumbbell-shaped particles of a predetermined size. Typically the resulting zinc powders produced by the thermal atomization process have a bulk density of 2.5–3.5 g/cc, a surface area of 0.1–0.4 $m^2/g$, and a particle size distribution between 0.0075 and 0.8 mm.

Although the thermal atomization technique allows zinc alloy powders to be produced with a wide variety of compositions, thermal atomization has at least two shortcomings over zinc alloy powders produced using the electrolytic co-deposition technique.

First, the morphology of zinc powder produced by the thermal atomization process is less than optimal. In order to achieve high continuous current drain, a large reservoir of active anode material is needed. Due to space and other considerations, this is generally best achieved by incorporating an active anode element having a highly porous morphology and a large surface area of active anodic material. By contrast, in order to achieve high peak power output, studies show that a tight interparticulate packing structure of the active anodic material is advantageous. This has traditionally come at the expense of porosity in known powdered anodes, which can drastically reduce the current capacity of the battery. Therefore, powder morphologies that have large surface areas and yet allow for a tight interparticulate anode structure are desired for battery and cell applications; such morphologies, however, cannot be obtained by the usual thermal processes.

When thermally prepared unamalgamated zinc is compressed sufficiently to form a self-supporting anode, usually with the help of organic binders, the spheroidal particles become well-packed, resulting in a relatively low zinc surface area overall. Lower surface areas limit the utilization potential of the zinc. In a battery application, this results in poor discharge performance. If thermally prepared zinc is used to form an anode with little or no compaction, such as in the case of a gelled anode, the contact area between the solid spherical particles is quite limited, resulting in batteries with low peak power output.

A second shortcoming of thermally produced zinc alloy powder is that it frequently is comprised of a two-phase alloy in which the inhibitor metal phase is not uniformly dispersed throughout the resulting alloy. The characteristically lower homogeneity with respect to inhibitor distribution in the alloy reduces corrosion inhibition and ultimately discharge performance for a given concentration of inhibitor metal.

Another method of treating zinc powder with an inhibitor metal is through cementation. Cementation can be used with thermally prepared zinc or electrolytically prepared zinc. An example of using cementation to treat thermally prepared zinc powder with one or more corrosion inhibitors is described in U.S. Pat. No. 4,084,047. According to this patent, powders of metal oxide inhibitors are thoroughly mixed with zinc and/or zinc oxide powder, typically in a water-slurry. The mixture is then dried and formed into an electrode for a secondary battery using standard pressed powder or paste techniques as are known in the art. The inhibitors taught in this patent are binary combinations of oxides and hydroxides of the Group III and Group IV series of elements, but exclude mercury. In particular, the patent teaches the use of the oxides of Tl, Pb, In, Cd, Sn, and Ga as inhibitors for zinc/zinc oxide electrodes. The resulting electrode is then used in known-in-the-art secondary battery cells employing an alkaline electrolyte. The patent acknowledges that oxides of certain of these inhibitor metals are more soluble in alkaline electrolytes than others. Indeed some are indicated to be virtually insoluble. The more soluble members in the series are said to be excellent corrosion inhibitors of zinc while all of the members of the series are excellent extenders and expanders (compounds that prevent recrystalization and densification of the active zinc material during cell recharging).

Two additional U.S. patents, assigned to the present applicant, describe variations on the cementation technique. U.S. Pat. No. 5,232,798 is directed to a process for inhibiting corrosion in particulate zinc by adding an oxide of an inhibitor metal to an alkaline slurry which includes particulate zinc. The particulate zinc is preferably electrolytically produced and is described as having a density of 0.3–1.4 g/cc and surface area of 0.5–6.0 $m^2$/g. The inhibitor oxide is selected from the oxides of antimony, bismuth, cadmium, indium, gallium, lead, mercury, thallium and/or tin and is preferably added to the slurry in a concentration of 0.05–4.0 parts by weight, based on the weight of the zinc. Similarly, U.S. Pat. No. 5,206,096 discloses a slurry for use in rechargeable metal-air batteries that includes particulate, porous, zinc and an inorganic inhibitor ingredient in an aqueous Group IA metal hydroxide solution. Inhibitor ingredients disclosed in this patent include the inhibitor metal oxides mentioned above in connection with U.S. Pat. No. 5,232,798. The particulate zinc included in the slurry also has properties similar to the particulate zinc disclosed in U.S. Pat. No. 5,232,798.

The problem in general with cementation is that it does not provide uniform corrosion protection throughout the entire discharge process because only the surface of the active zinc particles are treated with the inhibitor metal.

A third method of producing corrosion resistant zinc powders is through the electrolytic co-deposition of the zinc with an appropriate inhibitor metal or metals. A distinct advantage of the electrolytic co-deposition technique for producing corrosion resistant zinc powders is the potential for producing dendritic zinc alloy powders having highly intricate morphologies. The high surface area and compressibility of the dendritic zinc powder particles resulting from certain electroplating techniques can translate into superior discharge characteristics when the resulting powder particles are used to produce zinc anodes. For example, in cell fabrication procedures in which an alkaline slurry containing dendritic zinc particles is extruded or pressed onto an anode current collector, the dendritic zinc particles interlock together and densify. The interlocked zinc particles also bond onto the current collector. This provides a highly conductive zinc/alkaline matrix that is much more effective with respect to discharge capacity and peak power output than an equivalent electrode produced using thermal zinc. The intricate morphology and resulting compressibility of the dendritic zinc makes this improved discharge performance possible.

Furthermore, electrolytically produced zinc alloy powder is more homogeneous in terms of inhibitor distribution because the inhibitor metal is co-deposited throughout the plating process, resulting in a zinc powder product that is intrinsically alloyed throughout with trace inhibitor metals. Corrosion resistant zinc powders produced by physically mixing zinc powder with an inhibitor metal oxide, on the other hand, will have areas of inadequate inhibitor concentration, leading to a reduction in the effectiveness of the inhibitor. Similarly if the zinc is alloyed with the inhibitor metal in a thermal process, microsegregation of an inhibitor metal phase and zinc phase during solidification can result.

A number of patents have investigated the production of electrolytic zinc-inhibitor alloy powders for use in corrosion resistant electrodes. Two such examples are U.S. Pat. No. 5,378,329 and U.S. Pat. No. 5,419,987, both of which have been assigned to the present applicant. These two patents disclose methods of producing electrolytic zinc-inhibitor alloy powder. The methods disclosed in each include the common steps of electrolyzing an admixture comprised of zinc which has been at least partially oxidized to an oxidation product selected from the group consisting of zinc oxide, zinc hydroxide, and zincates; an aqueous solution of a Group IA metal hydroxide or zincate; and an inhibitor metal compound. The inhibitor metal compound being an oxide, hydroxide, carbonate or sulfate of an inhibitor metal such as lead, cadmium, tin, antimony, bismuth, gallium, and indium. Sufficient inhibitor metal compound(s) is dissolved in the aqueous Group IA electrolyte to provide a concentration of 5–1000 ppm of the cation species of the inhibitor metal(s). The electroplating conditions are selected such that a dendritic zinc alloy powder is deposited that contains from 0.001 to 4.0 percent by weight, based on the weight of zinc, of co-deposited inhibitor metal(s).

Alloying zinc with an inhibitor metal using the alkaline plating process described above, however, is limited by the solubility of the inhibitor metal salt in the electrolyte. Inhibitor metals having salts with low solubility will naturally alloy with zinc in lower concentrations. However, because corrosion retardation is a function of inhibitor metal concentration, some otherwise effective corrosion inhibitors cannot be alloyed with zinc in sufficient concentrations to obtain maximum protection using the electrowinning method described above. For example, while some inhibitor compounds like the oxides and hydroxides of lead, gallium and tin dissolve well in concentrated alkaline solutions, others such as the oxides and hydroxides of indium and bismuth, do not. In particular, both $In_2O_3$ and $Bi_2O_3$ have a maximum solubility of less than about 10 ppm in aqueous electrolytes containing KOH; the maximum solubility of In and Bi in concentrated KOH solutions being approximately 7 ppm and 5 ppm, respectively. Consequently, alloying zinc with these metals using known alkaline based electrolytic co-deposition techniques has not been able to fully exploit their potential as corrosion inhibitors for zinc anode applications. For example the maximum practicable concentration of In and Bi that can be electrolytically co-deposited with zinc in an electrowinning process of the type described above is approximately 200 ppm and 200 ppm, respectively.

Because sparingly soluble inhibitor metal compounds, such as $In_2O_3$ and $Bi_2O_3$, tend to slowly dissolve in the electrolyte, it is also difficult to maintain the concentration of the corresponding inhibitor metal in the electrolyte during the electrodeposition process when deposition rates practicable for commercial application are employed. As a result, it is currently infeasible to co-deposit a uniform concentration of a sparingly soluble inhibitor metal in a commercial electrowinning process.

A need exists, therefore, for an improved electrolytic method of producing dendritic zinc-inhibitor metal alloy powders that include inhibitor metals, the salts of which are only sparingly soluble in aqueous alkaline solutions. In particular, a need exists for a method of electrolytically producing zinc-inhibitor metal alloy powders that includes an alkaline electrodeposition process in which inhibitor metals that are only sparingly soluble in alkaline electrolytes can be co-deposited in concentrations that are not otherwise possible using current zincate electrowinning processes. Furthermore, to obtain superior performance in battery and cell applications, the resulting zinc-inhibitor metal alloy powder should have a high surface area and a dendritic structure with an intricate morphology. A need particularly exists for an electrolytic method of producing mercury-free zinc-inhibitor metal alloy powders that include indium in a concentration greater than 200 ppm or bismuth in a concentration greater than 200 ppm and that have a dendritic structure with a large surface area and an intricate morphology.

SUMMARY OF THE INVENTION

According to the present invention, there is now provided an improved method of producing mercury-free dendritic zinc-inhibitor metal alloy powders that include inhibitor metals, the salts of which are only sparingly soluble in aqueous alkaline solutions. The present invention also provides a method of electrolytically producing mercury-free zinc-inhibitor metal alloy powders that includes an alkaline electrodeposition process in which inhibitor metals that are only sparingly soluble in alkaline electrolytes can be co-deposited in concentrations that are not otherwise possible using currently known zincate electrowinning processes.

For purposes of this invention, an inhibitor metal salt, such as the oxide, hydroxide, carbonate, or sulfate of the inhibitor metal, is "sparingly soluble" in an alkaline electrolyte if less than about 10 ppm of the inhibitor metal salt is soluble in the alkaline electrolyte.

The method of producing mercury-free corrosion resistant dendritic zinc alloy powder according to one embodiment of the present invention comprises the steps of: a) preparing an electrolytic cell containing an aqueous alkaline electrolyte with a preselected concentration of dissolved zinc cations in solution, a non-zinc adherent cathode, a first anode, and a second anode, wherein the second anode comprises a first inhibitor metal, the salts of which are only sparingly soluble in the alkaline electrolyte; b) applying a first voltage between the first anode and cathode to establish a desired cathode current density and the deposition of dendritic zinc on the cathode; c) applying a second voltage between the second anode and cathode to establish a desired current density at the second anode and the simultaneous co-deposition of a desired concentration of the first inhibitor metal in the dendritic zinc; d) periodically removing the deposited zinc alloy from the cathode; and e) homogenizing the removed zinc alloy into a plurality of dendritic zinc alloy particles.

The resulting dendritic zinc alloy powder particles preferably have an average surface area between 0.5 and 1.8 $m^2/g$, a bulk density of between 0.5 and 1.3 g/cc, and an average particle size in the range of about 50 to 200 microns.

Preferably the aqueous alkaline electrolyte comprises an aqueous Group IA metal hydroxide solution, such as a solution containing potassium hydroxide, sodium hydroxide, or lithium hydroxide. As those skilled in the art will recognize, there are a number of potential sources for the dissolved zinc cations in the electrolyte. These include, by-way of example, zinc that has been at least partially oxidized to an oxidation product of zinc oxide, zinc hydroxide, or zincate.

Examples of non-zinc adherent cathodes suitable for practicing the present invention include stainless steel, magnesium, titanium, and vitreous carbon. Other suitable materials, however, may also be employed in the present invention and will be immediately apparent to those skilled in the art from reviewing the present disclosure.

The first anode is preferably a major anode and can be of the inert type, for example a nickel anode, optionally coated with an electrocatalyst having a low oxygen evolution over-voltage, or it can be of the dissolving reactive type, for example a zinc or zinc alloy anode. The second anode is preferably a minor anode comprised of an inhibitor metal, the salts of which are only sparingly soluble in the alkaline electrolyte. In the preferred embodiments of the invention, the second anode is preferably comprised of indium or bismuth, but, in practice, other inhibitor metals that are only sparingly soluble in alkaline electrolytes can also be used. Further, it will be apparent to those skilled in the art after reviewing the present disclosure that multiple major and minor anodes can be used in practicing the present invention to obtain dendritic zinc alloy particles of the desired composition and morphology. For example a combination of inert and reactive major anodes can be used. Similarly, one minor anode can be made out of indium and another out of bismuth. Alternatively, when multiple minor anodes are employed, other inhibitor metals that are alloyable with zinc can be used to form one or more of the minor anodes. However, at least one of the anodes in the electrolytic cell must comprise an inhibitor metal, the salts of which are only sparingly soluble in the alkaline electrolyte.

The aqueous alkaline electrolyte may also include cations of at least one inhibitor metal selected from the group consisting of lead, gallium, and tin. The cation species of these additional inhibitor metals are preferably provided by dissolving the oxide, hydroxide, carbonate or sulfate of the inhibitor metal(s) in the aqueous Group IA metal hydroxide electrolyte. Other compounds of the inhibitor metal may be used provided they do not introduce contaminant species or ions into the bath. When cations of one or more of these additional inhibitor metals are present in the electrolyte, they will co-deposit with the dendritic zinc as it is electroplated on the cathode and, as a result, they will be intrinsically alloyed therein.

As will be evident from the foregoing, a variety of zinc-inhibitor metal alloys can be produced using the method according the present invention. However, because at least one of the anodes included in the electrolytic cell will always comprise an inhibitor metal that is only sparingly soluble in the alkaline electrolyte, at least one sparingly soluble inhibitor metal will always be included in the electrodeposited zinc alloy.

The concentration of the sparingly soluble inhibitor metal in the final zinc alloy is directly controllable by varying the voltage between the second anode and cathode and thus the current density at the second anode. As a result, the dissolution reaction at the second anode can be driven forward by increasing the current density at the second anode. This makes it possible to co-deposit sparingly soluble inhibitor metals, such as bismuth and indium, in concentrations significantly greater than was previously possible when these inhibitor metals were co-deposited directly from an aqueous alkaline electrolyte in a traditional electrowinning process employing a cell with a standard inert, or even a soluble zinc, anode. The present invention also makes it commercially feasible for the first time to prepare dendritic zinc-inhibitor alloy powders that include effective concentrations of sparingly soluble inhibitor metals in an alkaline electrodeposition process.

If the concentration of indium and/or bismuth that is co-deposited in the method according to the present invention is within the range of 75 to 3500 ppm and 50 to 2400 ppm, respectively, corrosion inhibition can be obtained. Preferably, however, the concentration of indium and/or bismuth that is co-deposited is within the range of 250 to 3000 ppm and 100 to 2000 ppm, respectively. More preferably, the concentration of indium and/or bismuth that is co-deposited is within the range of 500 to 3000 ppm and 250 to 2000 ppm, respectively. And even more preferably, the concentration of indium and/or bismuth that is co-deposited is within the range of 1000 to 2600 ppm and 1000 to 1800 ppm, respectively.

Effective and preferred ranges of lead and gallium that can be co-deposited in the zinc alloy are provided in the table below:

| Inhibitor Element | Effective Range (in ppm) | Preferred Range (in ppm) |
| --- | --- | --- |
| Pb | 20–2500 | 500–1000 |
| Ga | 10–100 | 40–100 |

Unless otherwise noted, it is to be understood that the various concentrations of inhibitor metals expressed in terms of ppm and referenced throughout this application as being present in the zinc alloy are based on the weight of zinc and not the combined weight of zinc and the inhibitor metal(s).

Particularly preferred mercury-free electrolytic zinc alloy powders produced in accordance with the present invention include indium in a concentration greater than 200 ppm or bismuth in a concentration greater than 200 ppm and have a dendritic structure with a large surface area and an intricate morphology. The preferred zinc alloy powders according to the present invention include bismuth or indium in concentrations greater than 200 ppm because previously this was the maximum practicable concentration at which indium or bismuth could be electrolytically co-deposited with zinc to form dendritic zinc alloy powder particles.

Thus, according to a preferred embodiment of the present invention, a mercury-free corrosion resistant zinc alloy powder is provided that is comprised of a plurality of electrolytically prepared dendritic zinc alloy particles having a surface area between 0.5 and 1.8 $m^2/g$ and a bulk density of between 0.5 and 1.3 g/cc. The zinc alloy according to this embodiment comprises zinc as a major alloying element and bismuth as a minor alloying element in a concentration of between about 250 and 2400 ppm, the bismuth being intrinsically alloyed throughout each of the dendritic zinc alloy particles. In addition, the zinc alloy preferably further comprises at least one additional inhibitor metal selected from the following group in the specified concentration: lead in a concentration of about 20 to 2500 ppm, indium in a concentration of about 75 to 3500 ppm, and gallium in a concentration of 10 to 100 ppm. For improved performance in battery or cell applications, it is desirable for the zinc alloy particles to have an average particle size in the range of about 50 to 200 $\mu$m.

According to another preferred embodiment of the invention, a mercury-free corrosion resistant zinc alloy powder is provided that is comprised of a plurality of electrolytically prepared dendritic zinc alloy particles having a surface area between 0.5 and 1.8 $m^2/g$ and a bulk density of between 0.5 and 1.3 g/cc. The zinc alloy according to this embodiment of the invention comprises zinc as a major alloying element and indium as a minor alloying element in a concentration of between about 250 and 3500 ppm, the indium being intrinsically alloyed throughout each of the dendritic zinc alloy particles. Preferably the zinc alloy further comprises at least one additional inhibitor metal selected from the following group in the specified concentration: lead in a concentration of about 20 to 2500 ppm, bismuth in a concentration of about 50 to 2400 ppm, and gallium in a concentration of 10 to 100 ppm. For improved battery or cell performance, it is also preferable for the zinc alloy particles to have an average particle size in the range of about 50 to 200 $\mu$m.

Further objects and advantages of the present invention will be better understood from the following description considered in connection with the accompanying drawings in which the preferred embodiments of the invention are illustrated by way of example. It is to be expressly understood, however, that the drawings and examples are for the purposes of illustration and description only and are not intended as a definition of the limits of the invention.

DETAILED DESCRIPTION OF THE PREFERRED EMBODIMENTS

The present invention provides an improved method of producing dendritic zinc-inhibitor metal alloy powders that include inhibitor metals, the salts of which are only sparingly soluble in aqueous alkaline solutions. More particularly the present invention also provides a method of producing electrolytic zinc-inhibitor metal alloy powders that includes an alkaline electrodeposition process in which inhibitor metals that are only sparingly soluble in alkaline electrolytes can be co-deposited in concentrations that are not otherwise possible using currently known zincate electrowinning processes.

A preferred method of producing mercury-free corrosion resistant dendritic zinc alloy powder according to the present invention comprises the steps of: a) preparing an electrolytic cell containing an aqueous alkaline electrolyte with a preselected concentration of dissolved zinc cations in solution, a non-zinc adherent cathode, a first anode, and a second anode, wherein the second anode comprises a first inhibitor metal, the salts of which are only sparingly soluble in the alkaline electrolyte; b) applying a first voltage between the first anode and cathode to establish a desired cathode current density and the deposition of dendritic zinc on the cathode; c) applying a second voltage between the second anode and cathode to establish a desired current density at the second anode and the simultaneous co-deposition of a desired concentration of the first inhibitor metal in the dendritic zinc; d) periodically removing the deposited zinc alloy from the cathode; and e) homogenizing the removed zinc alloy into a plurality of dendritic zinc alloy particles.

Figure 1:
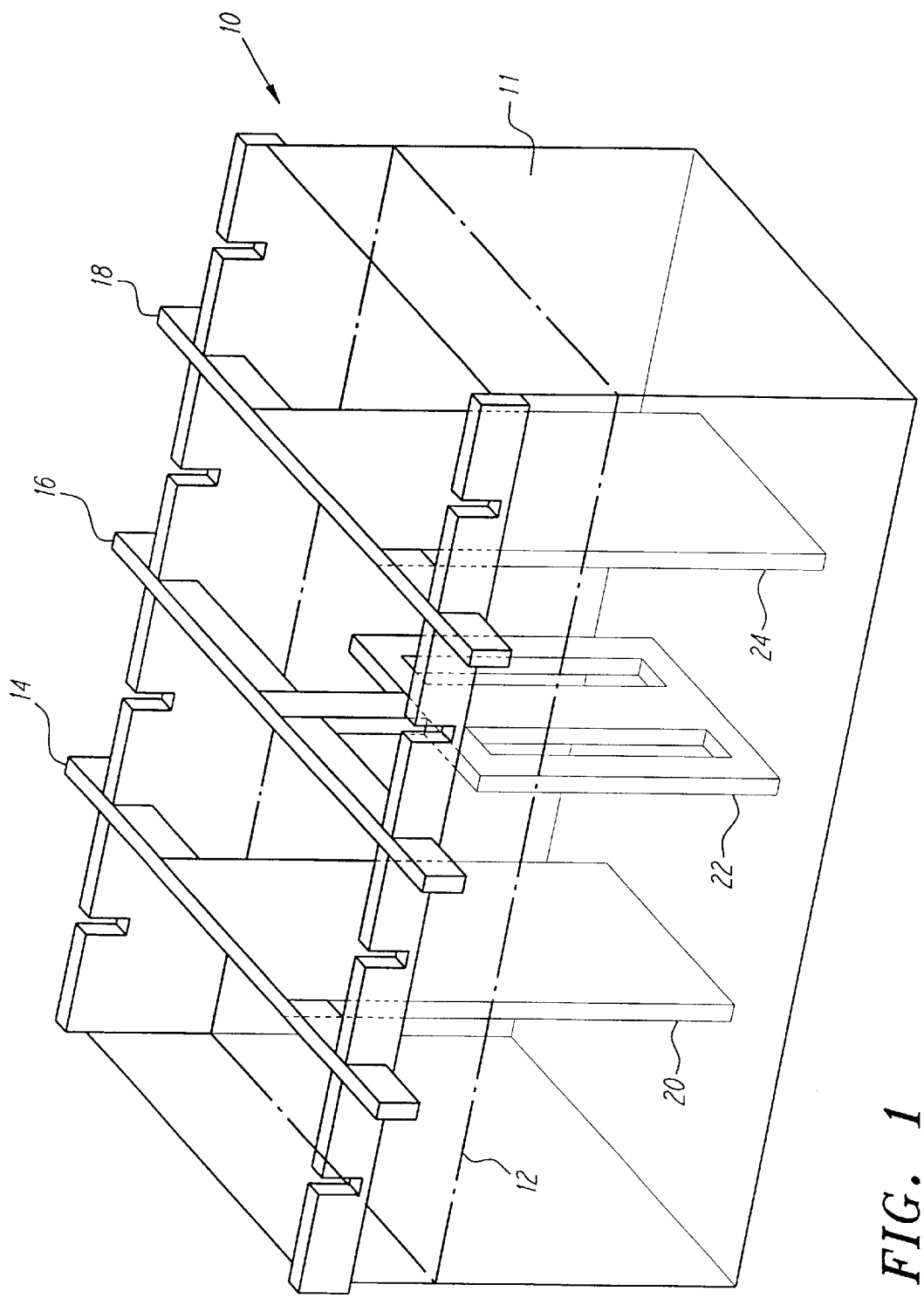
FIG. 1 is a perspective view of a preferred electrolytic cell design for preparing corrosion resistant zinc alloy powders according to the present invention.

Referring now to the drawings, and more particularly to FIG. 1, an electrolytic cell 10 that can be used to practice the method according to the present invention is now described.

Electrolytic cell 10 includes a container or bath 11 having an open top. Bath 11 should be made from a chemically inert material such as polypropylene, as is well known in the art. Bath 11 contains an aqueous alkaline electrolyte 12 with a preselected concentration of dissolved zinc cations in solution. Positioned across the top of bath 11 is a plurality of bus bars 14, 16, and 18. Bus bars 14, 16, and 18 provide means for suspending non-zinc adherent cathode 20, first or major anode 24, and second or minor anode 22 in the alkaline electrolyte 12. Bus bars 14, 16, and 18 also provide means for electrically connecting electrodes 20, 22, and 24 to power supplies 26, 28 as illustrated in FIG. 2.

Figure 2:
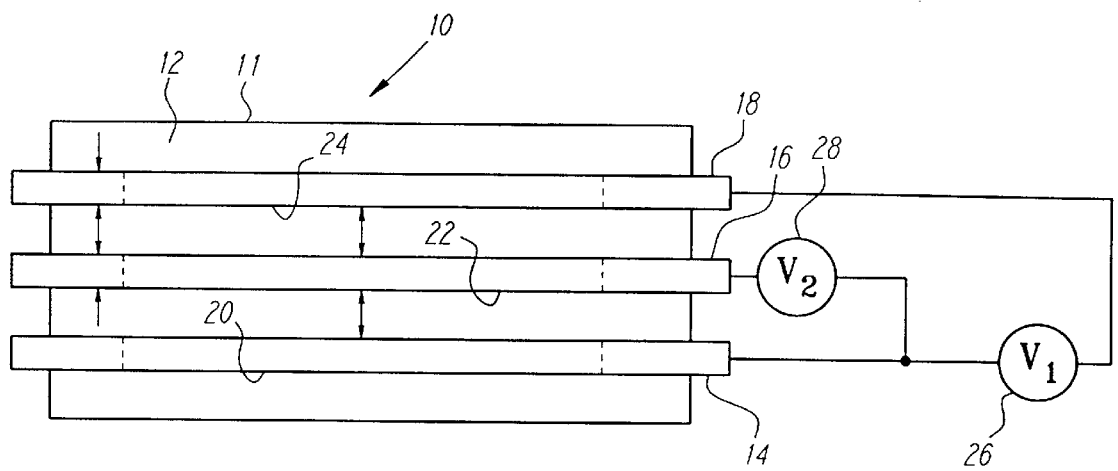
FIG. 2 is a schematic top view of the electrolytic cell construction of FIG. 1 showing the electrical connections for the power supplies of each electrode.

As illustrated in FIG. 2, electrolytic cell 10 includes two direct current power supplies 26, 28. Each anode 22, 24 therefore has an independent DC power supply 26, 28 coupling it to cathode 20. The positive side of the first power supply 26 is electrically connected to the first or major anode 24. Similarly, the positive side of the second power supply 28 is electrically connected to the second or minor anode 22. The negative side of both power supplies 26, 28 are connected together and to the cathode 20. As those skilled in the art will recognize, however, other arrangements are possible for providing different and variable potentials between the cathode and respective anodes. For example, a single power supply could be employed for both the first anode 24 and second anode 22. In this case, a variable resistive load would be connected in series with the second anode to reduce the voltage to the second anode. This latter arrangement is less efficient from an energy standpoint because a considerable amount of power is lost to the resistive load.

The aqueous alkaline electrolyte 12 is preferably an aqueous solution containing one or more Group IA metal hydroxides, such as potassium hydroxide, sodium hydroxide, and lithium hydroxide. The method according to the present invention is operable if the aqueous alkaline electrolyte 12 is a 5 to 10 molar solution of the selected Group IA metal hydroxide(s). Preferably, however, the electrolyte is a 7.2 to 7.8 molar solution, and more preferably the electrolyte is a 7.4 to 7.6 molar solution. The optimum molarity of the solution is approximately 7.5. Electrolyte solutions having a molarity of less than 7.2 tend to produce a less than optimal alloy structure, while electrolytes having a molarity greater than 7.8 tend to result in zinc alloy powders having poorer corrosion resistance performance.

As will be apparent to those skilled in the art, there are a number of potential sources for the dissolved zinc cations in alkaline electrolyte 12. These include, by way of example, zinc that has been at least partially oxidized to an oxidation product of zinc oxide, zinc hydroxide, or zincate.

During operation of the cell, the $Zn^{2+}$ concentration in electrolyte 12 should be maintained in a range of about 30 to 43 g/L, and preferably in the range of 38 to 43 g/L. The optimum concentration of $Zn^{2+}$ cations in solution during operation of the cell is approximately 40 g/L.

When the concentration of the $Zn^{2+}$ cations falls below about 30 g/L the current efficiency of the electrolytic cell begins to drop causing the zinc alloy structure that is electrodeposited on the cathode to flatten out and be less dendritic. The upper limit of 43 g/L of $Zn^{2+}$ represents the upper limit of the amount of zinc that can be practicably dissolved in the electrolyte solution.

Examples of non-zinc adherent cathodes 20 suitable for practicing the present invention include stainless steel, magnesium, titanium, and vitreous carbon. Other suitable materials, however, may also be employed in the present invention and will be immediately apparent to those skilled in the art after reviewing the present disclosure. There are two primary requirements for an acceptable non-zinc adherent cathode 20. First, non-zinc adherent cathode 20 should permit the formation of dendritic zinc alloy particles during the electro-deposition process. Second, non-zinc adherent cathode 20 should readily permit the removal of the electrodeposited zinc alloy from the cathode surface by a method such as scraping, brushing, spraying, vibrating, or ultrasonic vibration. Magnesium is a particularly preferred non-zinc adherent cathode material for practicing the present invention.

Positioned apart from and facing the cathode 20 is a first or major anode 24. Major anode 24 is suspended in the electrolyte 12 from major anode bus bar 18. The major anode 24 can be of the inert, insoluble type or reactive, soluble type. By way of example only, an inert major anode 24 may be made of nickel, sintered nickel, or nickel mesh. If of the inert type, major anode 24 can also be coated with a surface coating of an electrocatalyst having a low oxygen evolution over-voltage, for instance, a mixed oxide of cobalt and nickel. If dissolvable, then the major anode 24 is preferably made of zinc, a zinc alloy, or indium. If anode 24 is made of zinc or zinc alloy, the zinc cation concentration in the electrolyte 12 will be replenished as it is consumed or dissolved during the electro-deposition process. If anode 24 is made out of indium, then anode 24 will provide a source of indium to be intrinsically alloyed with the zinc during the electrodeposition process.

Preferably, the first or major anode has the same cross sectional area as the cathode so that the current density established at the cathode 20 by the first power supply 26 is the same as the current density at the major anode 24.

Interposed between the cathode 20 and the major anode 24 is at least one minor anode 22 composed of a corrosion inhibiting metal, the salts of which are sparingly soluble in the alkaline electrolyte 12. Preferably minor anode 22 is comprised of bismuth or indium because the salts of these metals have a maximum solubility of less than 10 ppm in the alkaline electrolyte. As a result, these metals are not as easily alloyed as other metals by direct dissolution in an alkaline electrowinning bath.

The maximum practicable limits for alloying indium and bismuth by direct co-deposition with electrolytic zinc using conventional alkaline electrowinning processes are about 200 ppm and 200 ppm, respectively. These amounts produced by the conventional method are not amenable to scale up for industrial production. Furthermore, because the salts of these inhibitor metals dissolve very slowly in the alkaline electrolyte, the rate of their inclusion in zinc must proceed slowly in the electrowinning process. Consequently, the inclusion of appreciable or uniform concentrations of indium and bismuth in dendritic zinc alloy powders produced using alkaline electrowinning processes has been impractical to date.

While minor anode 22 is preferably made from bismuth or indium, as those skilled in the art will recognize, minor anode 22 may also be made from other effective inhibitor metals that are only sparingly soluble in alkaline electrolytes. Furthermore, instead of using pure sparingly soluble inhibitor metals for minor anode 22, alloys comprising zinc and the desired sparingly soluble inhibitor metal may also be used for minor anode 22. For example, when introducing bismuth or indium into the electrodeposited dendritic zinc alloy, a minor anode 22 comprising a zinc-bismuth or a zinc-indium alloy can be used.

Because the inhibitor metals used for minor anode 22 tend to crumble as they are consumed during the electrodeposition process, minor anode 22 is preferably encased in an alkali resistant mesh or a non-woven battery separator bag made of long-chain synthetic polymeric amides or polypropylene. These anode bags catch any sludge accumulating during the process. Similarly, if a dissolvable first or major anode 24 is used, it should also be placed in an anode bag to prevent contamination of the plating bath with anode sludge.

Due to its positioning between the cathode 20 and major anode 24, the minor anode 22 should be formed so as to permit zinc ion migration towards the cathode. This can be accomplished in a number of ways. For example, adequate zinc ion migration can be ensured through the use of a perforated minor anode 22 or, alternatively, by using a minor anode 22 that is smaller in cross-sectional area than the cathode and major anode. Other possible configurations will be apparent to those skilled in the art from reviewing the present disclosure.

Figure 3:
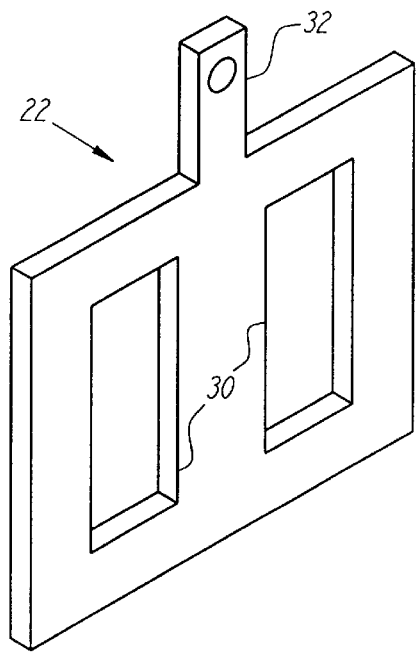
FIG. 3 is a close-up perspective view of a preferred minor anode design for use in the electrodeposition method of the present invention.

FIG. 3 shows a perspective view of a preferred configuration of the minor anode 22 for use in electrolytic cell 10. According to the configuration illustrated in FIG. 3, minor anode 22 comprises a rectangular sheet of the sparingly soluble inhibitor metal that has at least one pair of rectangular holes 30 symmetrically cut out about the center of the anode 22. The minor anode 22 is suspended by attaching tab 32 extending from the top of the electrode to the minor anode bus bar 16 traversing the open top of bath 11. The holes 30 enable zinc ions to migrate from the major anode 24 to the cathode 20.

The shape of holes 30 is somewhat arbitrary. However, holes 30 should be symmetrically located in minor anode 22 to ensure that a uniform concentration of inhibitor metal is co-deposited in the dendritic zinc alloy formed across the surface of cathode 20.

Figure 4:
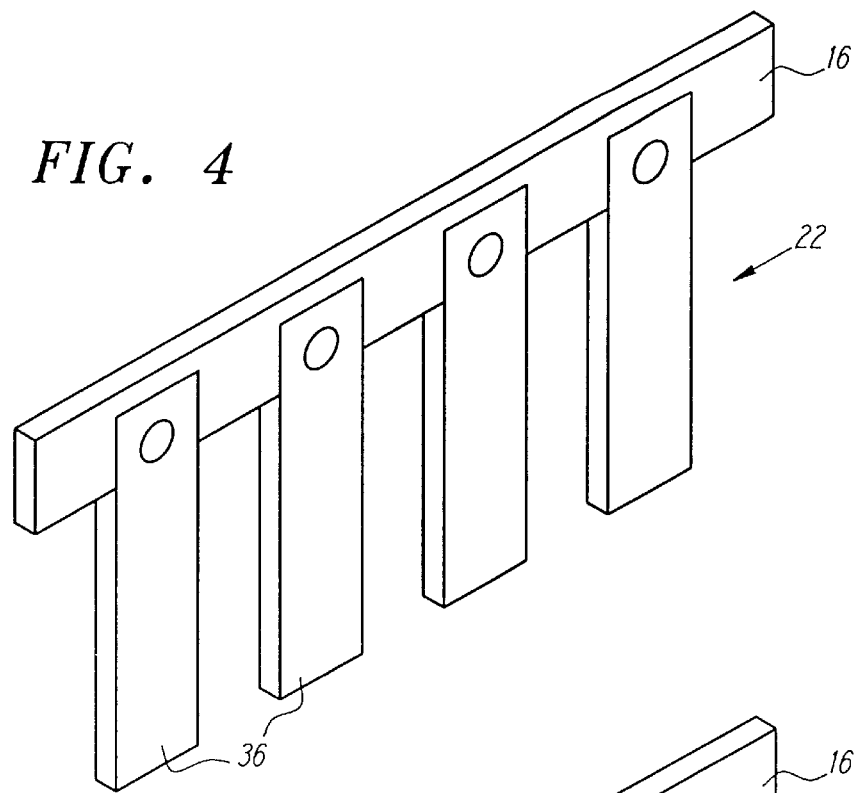
FIG. 4 is a close-up perspective view of an alternative minor anode design for use in the electrodeposition method of the present invention.

FIG. 4 shows an alternative embodiment of a minor anode 22 that can be used in electrolytic cell 10 to practice the present invention. Instead of a single sheet with holes, strips 36 of the sparingly soluble inhibitor metal to be alloyed with the zinc, preferably indium or bismuth, form the minor anode 22. The strips 36 are suspended from, and electrically connected to each other via the minor anode bus bar 16. To ensure that a uniform concentration of inhibitor metal is co-deposited in the electrodeposited zinc alloy, the strips should be symmetrically positioned along the length of minor anode bus bar 16 and be of the same dimensions.

Figure 5:
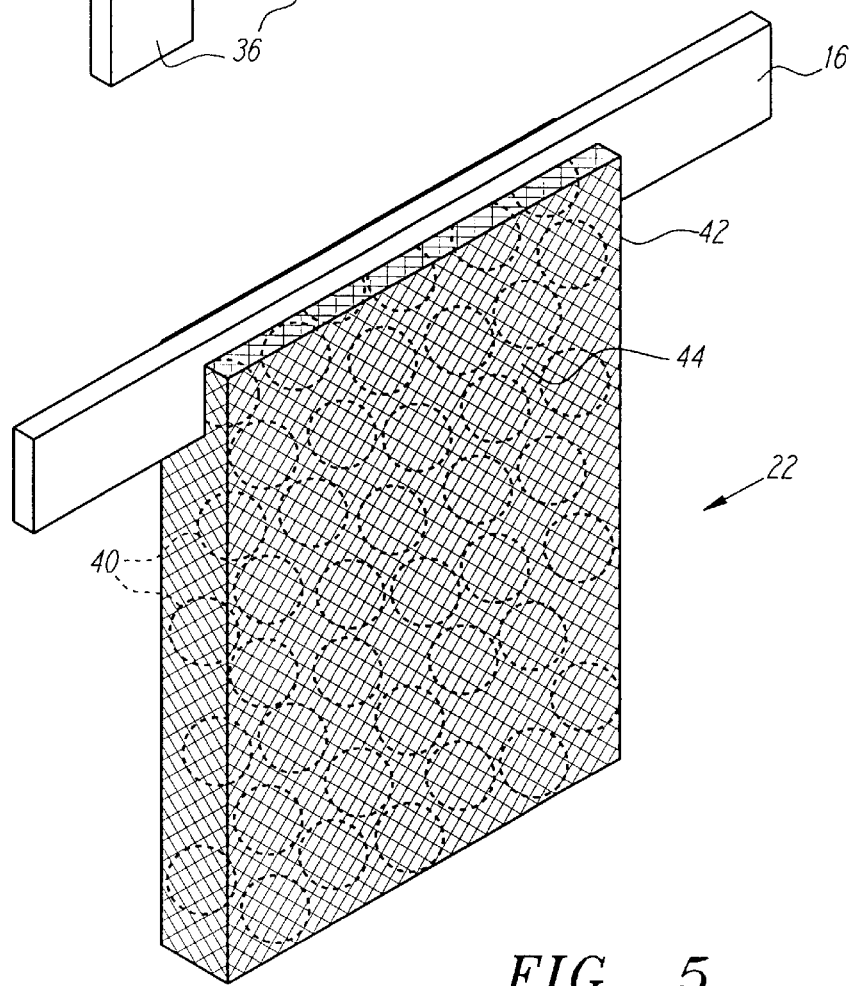
FIG. 5 is a close-up perspective view of another alternative minor anode design for use in the electrodeposition method of the present invention.

FIG. 5 shows yet another alternative embodiment of a minor anode 22 for use in practicing the present invention. According to this embodiment, minor anode 22 is formed of a plurality of anode balls 40 contained in an electrically conductive cage 42. The plurality of anode balls 40 are made of the sparingly soluble inhibitor metal to be alloyed with the zinc, for example, indium or bismuth. Electrically conductive mesh cage 42 is preferably made of an inert metal such as nickel. Spaces 44 between the balls 40 permit zinc ion migration to the cathode 20 while mesh cage 42 maintains electrical contact between minor anode bus bar 16 and the plurality of anode balls 40 contained within the mesh cage.

The actual surface area of the minor anode 22 is irrelevant so long as zinc ion migration toward the cathode 20 is not adversely inhibited. The more important parameter in determining the rate of transfer of the sparingly soluble inhibitor metal is the current density established at the minor anode 22. However, because the final dendritic zinc alloy particles require a relatively low concentration of the sparingly soluble inhibitor metal for effective corrosion inhibition, large minor anodes 22 are not required. In practice, it has been found that minor anodes 22 having a surface area between 10 to 500% of that of the major anode 24 have proven adequate.

Similarly, the distance the minor and major anodes 22, 24 are positioned from the cathode 20 is not a critical factor. Rather, the most important parameters is the current density established at the minor anode 22 by the DC power supply 28 and the current density established at the cathode 20 by DC power supply 26. However, if the anodes are positioned too close to the cathode, they may interfere with the removal of the electro-deposited dendritic zinc alloy or result in shorting. Too large a distance between the cathode and the anodes, on the other hand, will lead to large voltage losses, making the process less efficient.

The electrodeposition process according to the present invention is very robust in terms of temperature and thus can be operated at a wide range of temperatures. For example, at the upper end, the temperature is generally limited by the material limitations of the processing equipment, not the electrodeposition process itself. Preferably, the bath 11 is operated in a range of about 10 to 60° C. Operating at room temperature is particularly desirable so that additional equipment is not required to heat or cool the bath during operation.

The current density established at cathode 20 as a result of the voltage applied between the cathode 20 and the major anode 24 determines the morphological characteristics of the electrodeposited zinc alloy and the rate of zinc deposition. In particular, increasing the voltage of major anode 24 increases the rate of zinc deposition, while decreasing the voltage of the major anode 24 slows the deposition rate of zinc. On the other hand, changing the voltage of the major anode 24 has no effect on the amount of sparingly soluble inhibitor metal from anode 22 that is co-deposited. Obviously, however, without similarly adjusting the transfer rate of the sparingly soluble inhibitor metal from anode 22, the concentration of the sparingly soluble inhibitor metal in the resulting dendritic zinc alloy will be effected if the rate of zinc deposition is increased or decreased.

The current density established at minor anode 22 as a result of the voltage applied between the cathode 20 and the minor anode 22 determines the inhibitor metal transfer rate through the electrolyte solution 12 and thereby its concentration in the electrodeposited zinc alloy. For example, increasing the minor anode voltage, i.e., the minor anode current density, increases the transfer rate of the sparingly soluble inhibitor metal comprising anode 22 through electrolyte 12. Conversely, decreasing the minor anode voltage, i.e., the minor anode current density, decreases the transfer rate of the inhibitor metal comprising anode 22 through electrolyte 12. Thus, for a given zinc deposition rate, the concentration of the inhibitor metal comprising anode 22 that is co-deposited can be selectively controlled over a wide range by controlling the voltage applied between the cathode 20 and minor anode 22.

The voltage applied between the cathode 20 and first or major anode 24 by the power supply 26 is preferably such that the cathode current density falls within the range of about 20–200 $mA/cm^2$. As noted above, if the first or major anode 24 has the same cross-sectional area as the cathode 20 then it will also have the same current density. On the other hand, the voltage applied between the cathode 20 and minor anode 22 is preferably such that the current density at the second or minor anode 22 is in the range of 5–150 $mA/cm^2$. In practice, the current density at the minor anode 22 will depend upon the surface area of the minor anode, with higher current densities being employed with minor anodes 22 having smaller surface areas. As those skilled in the art will appreciate, this is necessary to increase the rate of dissolution of the minor anode 22 and thereby supply the same concentration of inhibitor metal cations in solution as is possible with a minor anode of larger surface area and a lower current density.

Optimally the current density of the cathode 20 and major anode 24 is within the range of 125–150 $mA/cm^2$ with an acceptable maximum and minimum operating range of 200 $mA/cm^2$ and 100 $mA/cm^2$, respectively. Current densities of less than about 100 $mA/cm^2$ are not practical from a commercial standpoint because the production rate of the electrodeposited zinc alloy is too slow. At current densities above about 200 $mA/cm^2$, the electrodeposited zinc tends to start flattening out and become less dendritic.

The optimal current density of the minor anode 22 is 25 $mA/cm^2$ for an indium minor anode and 10 $mA/cm^2$ for a bismuth minor anode, with a maximum of 150 $mA/cm^2$ and a minimum of 5 $MA/cm^2$ for both. The actual current density employed, however, will depend on the inhibitor metal comprising minor anode 22, the size of minor anode 22, the desired concentration of the inhibitor metal in the deposited dendritic zinc alloy, and the rate of deposition of the zinc on the cathode 20.

Once the appropriate current densities are established, the deposition and alloying of the zinc and inhibitor metal on the cathode 20 proceeds. Periodically, the deposited dendritic zinc alloy is removed from the cathode. Preferably this occurs every one to five minutes so that a fine, uniform particulate can be formed in the subsequent homogenizing step. The deposited zinc alloy can be removed from the cathode 20 by any one of a number of methods, including scraping, brushing, vibrating, ultrasonic vibration, and the use of liquid spray jets. The removed zinc alloy is then homogenized or consolidated into a plurality of dendritic zinc alloy particles of a uniform size distribution by any of the methods known in the art, including, by way of example, brushing, stirring and blending.

Preferably the resulting dendritic zinc alloy powder particles have an average surface area between 0.5 and 1.8 $m^2/g$, a bulk density of between 0.5 and 1.3 g/cc, and an average particle size in the range of about 50 to 200 $\mu m$.

In the method according to the present invention, the sparingly soluble inhibitor metal, such as indium or bismuth, can be intrinsically and uniformly alloyed in the electrodeposited dendritic zinc alloy over a broad range of concentrations. If the concentration of indium or bismuth that is co-deposited is within the range of 75 to 3500 ppm and 50 to 2400 ppm, respectively, corrosion inhibition can be obtained. Preferably, however, the concentration of indium or bismuth that is co-deposited is within the range of 250 to 3000 ppm and 100 to 2000 ppm, respectively. More preferably the concentration of indium or bismuth that is co-deposited is within the range of 500 to 3000 ppm and 250 to 2000 ppm, respectively. And even more preferably, the concentration of indium or bismuth that is co-deposited is within the range of 1000 to 2600 ppm and 1000 to 1800 ppm, respectively. Thus, not only does the process according to the present invention permit sparingly soluble inhibitor metals to be co-deposited in electrolytically produced dendrite zinc alloy particles in a uniform concentration at commercially practical rates, but it also permits the introduction of such inhibitor metals in an alkaline based electrodeposition process in concentrations that were previously not possible.

The final dendritic zinc alloy particles may also include, intrinsically alloyed therein, one or more inhibitor metals that are soluble in electrolyte 12. For purposes of the present invention, an inhibitor metal is soluble in electrolyte 12 if at least one salt of the inhibitor metal can be dissolved in the electrolyte in a concentration greater than 10 ppm. Thus, in a particularly preferred variation of the present invention, aqueous alkaline electrolyte 12 further includes cations of at least one inhibitor metal that is soluble in the electrolyte solution. More particularly, electrolyte 12 preferably includes cations of at least one inhibitor metal selected from the group consisting of lead, gallium, and tin. The cation species of these additional inhibitor metals can be provided by dissolving the oxide, hydroxide, carbonate or sulfate of the inhibitor metal(s) in the alkaline electrolyte 12. For example, small amounts of lead oxide, gallium oxide and/or tin oxide can be added to the alkaline electrolyte, to obtain specific cation concentrations of these metals in the electrolyte, which in turn will result in the co-deposition of the additional inhibitor metal(s) in the electrodeposited dendritic zinc alloy. As will be apparent to those skilled in the art, the specific concentration of the soluble inhibitor metal(s) maintained in solution will depend on the concentration of the inhibitor metal(s) desired in the electrodeposited dendritic zinc alloy.

Compounds other than the oxide, hydroxide, carbonate or sulfate of the desired soluble inhibitor metal can also be used in the present process, provided they do not introduce contaminant species or ions to the bath.

If lead is added to electrolyte 12, its concentration is typically maintained in the range of about 20–50 ppm. Tin, however, is not as useful as lead as a co-deposited element in the dendritic zinc alloy due to the fact that tin is a less effective corrosion inhibitor metal than lead. Thus, if tin is to be used instead of lead as a corrosion inhibitor, generally much greater concentrations of tin will have to be maintained in the bath to obtain similar corrosion inhibition in the resulting dendritic zinc alloy powder. On the other hand, if gallium is added to electrolyte 12, it is typically maintained in lower concentrations due to the preference for much lower concentrations of this inhibitor metal in the zinc alloy ultimately produced, and also for economic reasons.

Effective and preferred ranges of the concentration of lead and gallium in the final dendritic zinc alloy are provided in the table below.

| Inhibitor Element | Effective Range (in ppm) | Preferred Range (in ppm) |
| --- | --- | --- |
| Pb | 20–1000 | 500–1000 |
| Ga | 10–100 | 40–100 |

Additional sparingly soluble inhibitor metals may also be incorporated into the final electrodeposited dendritic zinc by adding additional minor anodes comprised of the desired sparingly soluble inhibitor metal(s) to the electrolytic cell and establishing an appropriate current density at each of the additional minor anode(s) to cause their dissolution during the electrodeposition process. For example, two minor anodes, one of indium and the other of bismuth, may be employed in the process according to the present invention to result in an electrodeposited dendritic zinc alloy having both indium and bismuth intrinsically alloyed therein.

Figure 6:
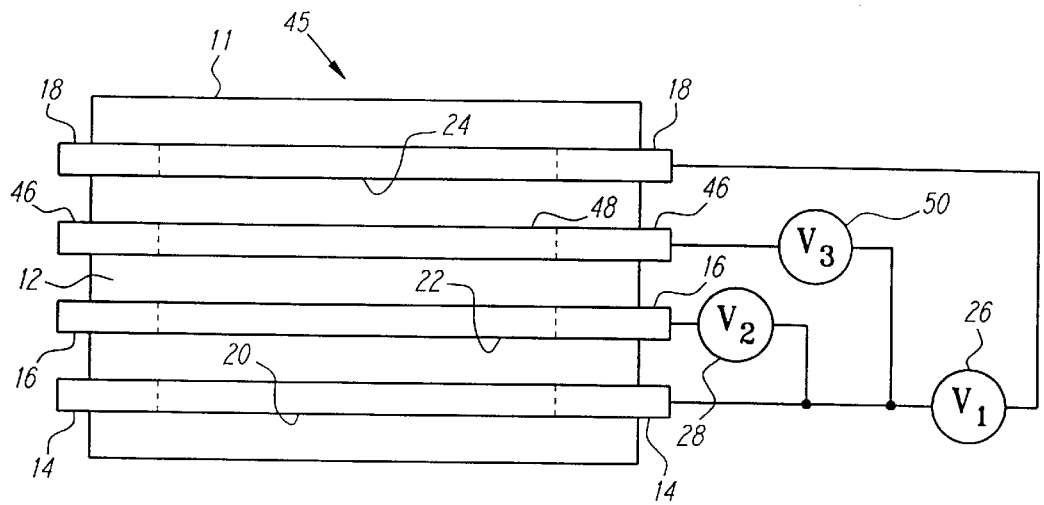
FIG. 6 is a schematic top view of a preferred electrolytic cell set-up for preparing corrosion resistant zinc alloy powder according to the present invention.

FIG. 6 is a schematic top view of an electrolytic cell 45 capable of producing an electrodeposited dendritic zinc alloy with two sparingly soluble inhibitor metals alloyed therein. For purposes of describing electrolytic cell 45, like elements have been denoted with the same reference number. Furthermore, except as specifically noted, the operation of electrolytic cell 45 is the same as the operation of electrolytic cell 10 described in connection with FIGS. 1–5. Similarly, the various descriptions and considerations discussed above in connection with the electrolyte 12 are equally applicable here.

The electrolytic cell 45 illustrated in FIG. 6, includes a container or bath 11 having an open top as illustrated in FIG. 1. Bath 11 contains an aqueous alkaline electrolyte 12 with a preselected concentration of zinc cations in solution. Electrolyte 12 preferably also includes cations of one or more soluble inhibitor metals in solution. Positioned across the top of bath 11 is a plurality of bus bars 14, 16, 18, and 46. Bus bars 14, 16, 46, and 18 provide means for suspending non-zinc adherent cathode 20, first minor anode 22, second minor anode 48, and major anode 24, respectively, in the alkaline electrolyte 12. Bus bars 14, 16, 18, and 46 also provide means for electrically connecting electrodes 20, 22, 24, and 48 to power supplies 26, 28, and 50 as illustrated in FIG. 6.

The primary difference between electrolytic cell 10 described in connection with FIGS. 1 and 2 and electrolytic cell 45 illustrated in FIG. 6 is that there are two minor anodes 22, 48 interposed between the non-zinc adherent cathode 20 and major anode 24. Preferably each of the minor anodes 22, 48 are comprised of a corrosion inhibiting metal, the salts of which are only sparingly soluble in the alkaline electrolyte 12. For example, minor anode 22 can be made out of indium, while the minor anode 48 can be made out of bismuth, or vice-versa. The present invention also contemplates that zinc alloys of these inhibitor metals can be used for minor anodes 22, 48 instead of using the pure inhibitor metal.

Pursuant to the present invention, it is also possible for one of the minor anodes 22, 48 to comprise an inhibitor metal that is sparingly soluble in the alkaline electrolyte, while the other minor anode comprises an inhibitor metal that is soluble in the alkaline electrolyte 12. This provides an alternative means for introducing inhibitor metals such as lead, gallium, and tin into the electrodeposited dendritic zinc alloy other than by dissolving a salt of these metals directly in the alkaline electrolyte 12.

Figure 9:
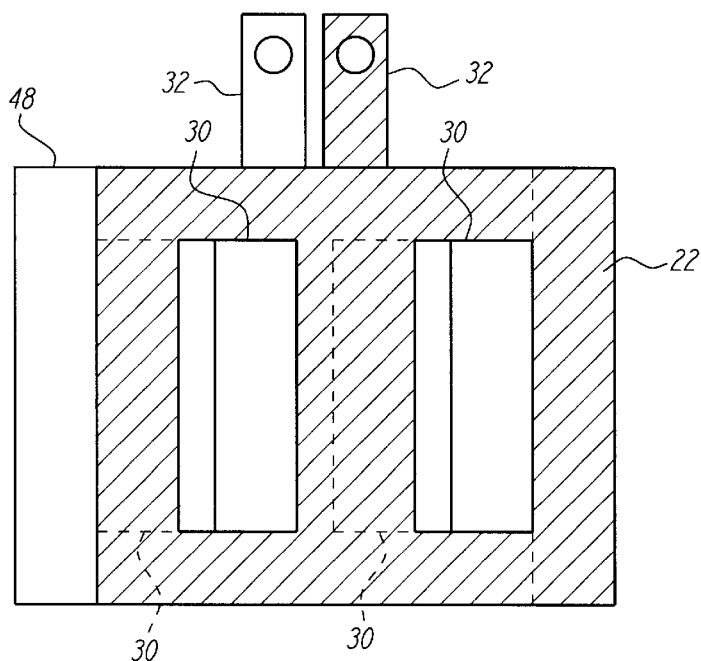
FIG. 9 illustrates a preferred arrangement of minor anodes in an electrolytic cell employing multiple minor anodes.

Because minor anode 48 is interposed between the cathode 20 and major anode 24, the various considerations discussed above in connection with minor anode 22 when describing electrolytic cell 10 are equally applicable to minor anode 48. Indeed, the various minor anode 22 configurations illustrated in FIGS. 3–5 can be similarly employed for minor anode 48. For example, FIG. 9 illustrates a front view of minor anodes 22, 48 having the configuration of the minor anode illustrated in FIG. 3. As illustrated, however, when minor anodes 22 and 48 are suspended in bath 11, they are preferably offset slightly from one another to facilitate ion migration through holes 30 to the cathode 20.

To prevent anode sludge from contaminating the electrolyte 12 during the electrodeposition process, minor anodes 22 and 48 are preferably placed in anode bags as described above.

As illustrated in FIG. 6, electrolytic cell 45 includes three direct current sources 26, 28, and 50. Thus, each anode 22, 24, and 48 has its own DC power supply coupling it to cathode 20. The positive side of the first power supply 26 is electrically connected to major anode 24. Similarly, the positive side of the second power supply 28 and the third power supply 50 are connected to the first minor anode 22 and the second minor anode 48, respectively. The negative side of all three power supplies 26, 28, and 50 are connected together and to the cathode 20. Thus, the minor anode voltages can differ from that of the major anode and even among themselves. As those skilled in the art will recognize, however, other arrangements are possible for providing different and variable potentials between the cathode and respective anodes. For example, a single power supply can be employed for all of the anodes. In this case, a variable resistive load would be connected in series with each of the respective minor anodes 22, 48 and the positive side of the power supply.

The voltages applied to each of the minor anodes 22, 48 are again designed to establish current densities appropriate for achieving the desired concentrations of each inhibitor metal in the electrodeposited zinc alloy. Where indium and/or bismuth have been chosen for minor anodes 22, 48, the current densities and considerations discussed above in connection with electrolytic cell 10 are directly applicable.

The dendritic zinc alloys produced using electrolytic cell 45 preferably include both indium and bismuth. However, as noted above, only one of the minor anodes need actually comprise a sparingly soluble inhibitor metal such as indium or bismuth. Thus, the electrodeposited dendritic zinc alloys produced using electrolytic cell 45 may simply comprise bismuth or indium and another inhibitor metal, which comprises the other minor anode. Those skilled in the art will appreciate from the description of electrolytic cell 10 above that the dendritic zinc alloys produced using electrolytic cell 45 will also include any soluble inhibitor metals present in the aqueous alkaline electrolyte 12.

It will further be apparent to those skilled in the art from the preceding description of electrolytic cells 10, 45 that any number of minor anodes can be employed in the process according to the present invention. At least one of the minor anodes in the electrolytic cell, however, must comprise an inhibitor metal that is only sparingly soluble in the alkaline electrolyte.

To maximize the production rate of the electrodeposited dendritic zinc alloy it is possible to utilize both sides of non-zinc adherent cathode 20 for depositing the electrolytic zinc alloy. This can be accomplished by setting up an electrolytic cell that includes a symmetrical distribution of minor and major anodes on both sides of cathode 20, such as illustrated in FIG. 7.

Figure 7:
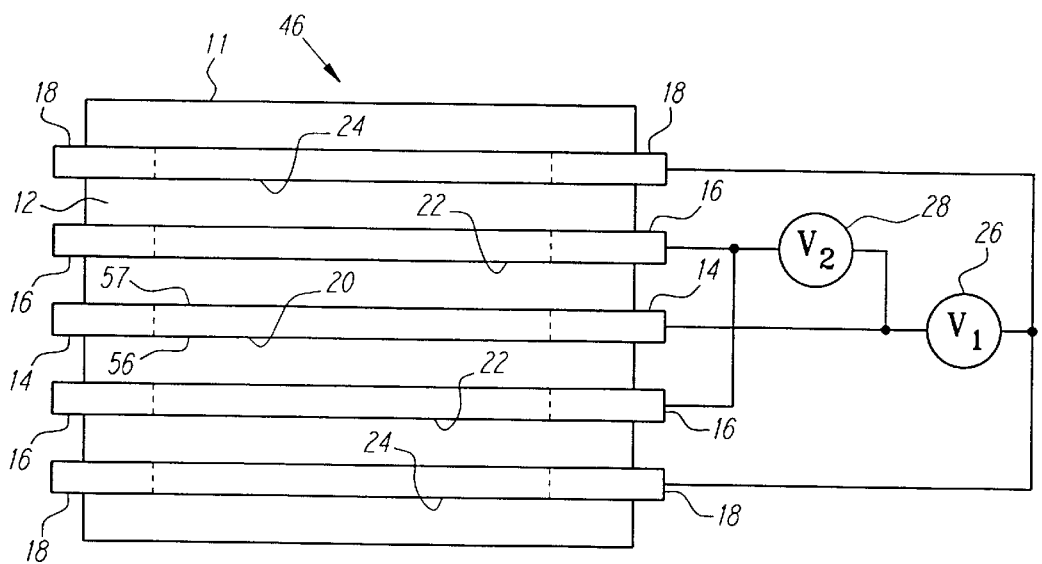
FIG. 7 is a schematic top view of an alternative preferred electrolytic cell set-up for preparing corrosion resistant zinc alloy powder according to the present invention.

The configuration of electrolytic cell 46 shown in FIG. 7 is similar to configuration of the electrolytic cell 10 shown in FIG. 2 except that electrolytic cell 46 includes a symmetrical distribution of minor and major anodes 22, 24 on both sides 56, 57 of non-zinc adherent cathode 20. In other words, an additional minor and major anode 22, 24 of the same composition and dimension as those on side 57 of the cathode 20 are symmetrically placed in the bath 11 on the opposite side 56 of the cathode 20. Both minor anodes 22 are electrically connected to the positive side of DC power supply 28, and both major anodes 24 are connected to the positive side of DC power supply 26. The negative side of power supplies 26, 28 are connected together and to the cathode 20. As a result of the foregoing cell set up, zinc alloy formation occurs on both sides 56, 57 of the cathode 20, from which the alloy is periodically removed and consolidated using any of the aforementioned techniques.

Except as noted above, the operation of electrolytic cell 46 is the same as the operation of electrolytic cell 10 previously described.

Figure 8:
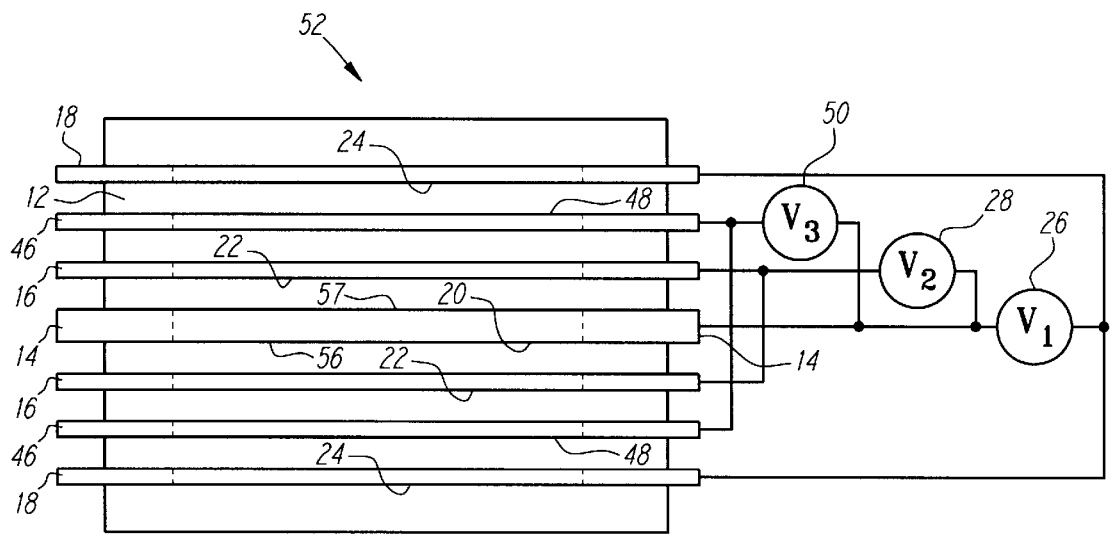
FIG. 8 is a schematic top view of another preferred electrolytic cell set-up for preparing corrosion resistant zinc alloy powder according to the present invention.

FIG. 8 illustrates another configuration of an electrolytic cell that permits zinc alloy formation to proceed on both sides of cathode 20 with up to two sparingly soluble inhibitor metals. The configuration of electrolytic cell 52 shown in FIG. 8 is similar to that of electrolytic cell 45 shown in FIG. 6 except that electrolytic cell 52 includes a symmetrical distribution of minor anodes 22, 48 and major anodes 24 on both sides 56, 57 of non-zinc adherent cathode 20. In other words, an additional first and second minor anode 22, 48 and major anode 24 having the same composition and dimension as those on side 57 of the cathode 20 are symmetrically placed in the bath 11 on the opposite side 56 of cathode 20. Both first minor anodes 22 are electrically connected to the positive side of DC power supply 28, and both second minor anodes 48 are connected to the positive side of DC power supply 50. Similarly, both major anodes 24 are electrically connected to the positive side of DC power supply 26. The negative side of power supplies 26, 28, and 50 are all connected together and to the cathode 20. As a result of the foregoing cell set up, zinc alloy formation occurs on both sides 56, 57 of the cathode 20, from which the alloy is periodically removed and consolidated using any of the aforementioned techniques.

Except as noted above, the operation of electrolytic cell 52 is the same as the operation of electrolytic cell 46 previously described.

As will be evident from the foregoing description of the method according to the present invention, a variety of mercury-free corrosion resistant dendritic zinc-inhibitor metal alloy powders can be produced using the method according the present invention. However, because at least one of the anodes included in the electrolytic cell will always comprise an inhibitor metal that is only sparingly soluble in the alkaline electrolyte, at least one sparingly soluble inhibitor metal will always be included in the electrodeposited zinc alloy. Thus, the mercury-free zinc alloy powders produced in accordance with the present invention will typically include bismuth and/or indium. In addition, the zinc alloy powders produced in accordance with the present invention also preferably include lead, gallium, tin, or a combination of these metals.

If the concentration of indium and/or bismuth that is co-deposited in the method according to the present invention is within the range of 75 to 3500 ppm and 50 to 2400 ppm, respectively, corrosion inhibition can be obtained. Preferably, however, the concentration of indium and/or bismuth that is co-deposited is within the range of 250 to 3000 ppm and 100 to 2000 ppm, respectively. More preferably, the concentration of indium and/or bismuth that is co-deposited is within the range of 500 to 3000 ppm and 250 to 2000 ppm, respectively. Most preferably, the concentration of indium and/or bismuth that is co-deposited is within the range of 1000 to 2600 ppm and 1000 to 1800 ppm, respectively. In particularly preferred zinc alloy powders according to the present invention that include bismuth or indium as an inhibitor metal, the concentration of bismuth or indium in the zinc alloy is at least 250 ppm, a concentration significantly above that which was previously possible using an electrowinning cell.

Effective and preferred ranges of additional inhibitor metals that can be co-deposited, either individually or in combination, in the dendritic zinc alloy powders according to the present invention are provided in the table below:

| Inhibitor Element | Effective Range (in ppm) | Preferred Range (in ppm) |
|---|---|---|
| Pb | 20–2500 | 500–1000 |
| Ga | 10–100 | 40–100 |

The concentration of inhibitor metal(s) in the mercury-free corrosion resistant zinc alloy powders produced in accordance with the present invention are preferably sufficient to limit the corrosion rate of the powder to a rate of about 0.20% per week or less when measured at 50° C. in a 10 M KOH solution. More preferably, the resulting zinc-alloy powder has a corrosion rate of less than about 0.1% per week under the specified conditions, and most preferably it has a corrosion rate of less than about 0.03% per week. In this regard, it has been found that more effective corrosion inhibition is typically obtained if indium and/or bismuth are included in the zinc alloy with another inhibitor metal such as lead as opposed to when they are alloyed with the zinc by themselves. Indeed, zinc-inhibitor metal alloy powders including indium, bismuth, lead, and gallium in their preferred concentration ranges identified above have exhibited particularly good corrosion rates that did not exceed 0.030% per week when measured at 50° C. in a 10 M KOH solution.

The corrosion rate of the dendritic zinc alloy powders according to the present invention can be further improved by treating them with an organic inhibitor. For example, when dendritic zinc alloy powders according to the present invention are treated with RHODAFAC RA 600 of Rhone-Poulenc Co., corrosion rates significantly less than 0.01% per week can be achieved.

To achieve optimal discharge charateristics and good compressibility of the resulting dendritic zinc alloy powder, dendritic zinc alloy powder should have a surface area between 0.5 and 1.8 $m^2/g$ and a bulk density of between 0.5 and 1.3 g/cc. Similarly, the average particle size of the zinc alloy powder should be maintained in the range of about 50 to 200 $\mu$m.

Non-limitative examples illustrating the above-described methods for producing mercury-free corrosion resistant zinc alloy powders according to the present invention are now illustrated.

EXAMPLE I

A reference zinc sample was deposited at room temperature from a bath containing four liters of a 7.5 N KOH electrolyte prepared by dissolving KOH in distilled water. The electrolyte further contained an initial zincate concentration of 40 g/L (198 g of ZnO). Before electrowinning the zinc from solution, the electrolyte was purified using zinc powder. As a result, inhibitor metal concentrations in the bath were negligible. Two nickel anodes were symmetrically positioned around a polished magnesium cathode, one on each side. The distance between each anode and the cathode was 1.2 cm. The area of each anode was 100 $cm^2$ and that of the cathode was 200 $cm^2$, including both sides. A cathode current density of 150 $mA/cm^2$ was then applied.

With the cathode scraped every 4 minutes, the electrowinning process was run for 1.5 hrs, after which the zincate concentration in the electrolyte had decreased to 28 g/L. Stirring was effected by the hydrogen gas evolved during the electrolysis. The corrosion rate of the deposited reference dendritic zinc powder particles was 2.5% per week when measured at 50° C. in a 10 M KOH solution. When this zinc was mixed with the organic inhibitor RHODAFAC RA 600, the corrosion rate under the same conditions was 0.3% per week.

EXAMPLE II

Using the same electrode configuration as in Example I, an electrowon zinc alloy was deposited at room temperature from a bath containing four liters of a 7.5 N KOH electrolyte having an initial zincate concentration of 41 g/L (203 g ZnO). The electrowinning solution was again purified with zinc powder so that the inhibitor metal concentration in the electrolyte would be negligible. About 0.03 g of lead oxide was then added to the bath where it dissolved to form plumbates.

A current density of 175 $mA/cm^2$ was then applied. The cathode was scraped every 5 minutes during an electrolysis period of 1.15 hrs, at the end of which the zincate concentration in the electrolyte had decreased to 30 g/L. Stirring was again effected by hydrogen gas evolution.

The electrowon zinc-lead alloy had a dendritic structure and contained 580 ppm of lead. The particle sizes of the reference dendritic zinc-lead alloy particles were smaller than the dendritic zinc powder particles in Example I.

The corrosion rate of the dendritic zinc-lead alloy powder particles was 0.32% per week when measured at 50° C. in a 10 M KOH solution.

EXAMPLE III

Dendritic zinc alloy particles according to the present invention were prepared using an electrolytic cell configuration similar to that illustrated in FIG. 7. The dendritic zinc alloy was electrodeposited at room temperature from a bath containing four liters of a 7.5 N KOH electrolyte prepared by dissolving KOH in distilled water. The electrolyte also contained 40 g/L zincate (198 g ZnO). Before electrodeposition began, the solution was purified with zinc powder. Fifty milliliters of Pb/KOH solution, 6000 ppm in lead, was then added to the electrolyte. The cathode and major anodes were the same as those employed in Example I in terms of material, size, and configuration. The electrolytic cell also contained two indium minor anodes each positioned symmetrically on opposite sides of the cathode so that they were interposed between the magnesium cathode and nickel anodes. The indium minor anodes were positioned at a distance of 1.2 cm from the magnesium cathode and 1.3 cm from the nickel anodes positioned on each side of the cathode (See FIG. 7).

Voltages were then simultaneously applied between the nickel anodes and cathode and the indium anodes and cathode. The current density for the cathode and major anodes was set at 200 $mA/cm^2$ while the current density of the minor anodes was set at 15 $mA/cm^2$. The zincate concentration decreased to 29.5 g/L at the end of an electrolysis period lasting 57 min. Stirring was again effected by hydrogen gas evolution. The cathode was scraped every 5 minutes throughout the electrodeposition process.

A very fine dendritic zinc alloy powder was produced with a lead concentration of 600 ppm and an indium concentration of 1700 ppm. The corrosion rate of the zinc alloy powder was 0.21% per week when measured at 50° C. in a 10 M KOH solution.

EXAMPLE IV

A four-liter electrolytic bath like the one used in Example III was prepared. In addition to a cathode and major anode as in Example I, two types of minor anodes (bismuth and indium) were also symmetrically placed in the bath between the cathode and opposing major anodes to form an electrolytic cell of the type illustrated in FIG. 8. The indium anodes were positioned closest to the cathode with the bismuth anode being interposed between the indium anode and nickel anode on each side of the cathode. The indium anodes were positioned approximately 1.2 cm from the cathode, while the bismuth anodes were positioned 1.3 cm from the indium anodes. The nickel anodes were positioned approximately 1.5 cm from the bismuth anodes.

An electrolyzing current was then applied between each of the anodes and cathode. The current density of the major anodes and cathode was set at 175 $mA/cm^2$ while those of the indium and bismuth anodes were set at 30 and 18 $mA/cm^2$, respectively. The cathode was scraped every 5 minutes to remove the deposited dendritic zinc alloy. After an electrodeposition period of 55 minutes at room temperature, the zincate concentration had decreased to 32 g/L and the deposition process was stopped. Stirring was again effected by hydrogen gas evolution.

A very fine dendritic zinc alloy powder was produced from the dendritic zinc alloy removed from the cathode. The inhibitor metal concentrations in the resulting dendritic zinc alloy powder particles were 920 ppm, 3500 ppm, and 2320 ppm for lead, indium and bismuth, respectively. The corrosion rate of the dendritic zinc alloy powder was 0.12% when measured at 50° C. in a 10 M KOH solution.

EXAMPLE V

A bath containing four liters of a 7.5 N KOH electrolyte was prepared by dissolving KOH in distilled water. Sufficient ZnO was then added to the electrolyte to provide a zincate concentration of 41 g/L (203 g ZnO). After purifying the electrolyte with zinc powder, 75 ml of a Pb/KOH solution, 6000 ppm in Pb, and 10 ml of a Ga/KOH solution, 1000 ppm in Ga, were added. The volumes of these additives were deliberately restricted in order to produce zinc with the desired concentrations of Pb and Ga.

The electrodes, their sizes and their positions were the same as in Example IV.

An electrolyzing current was then applied between each of the anodes and cathode. The current density of the cathode and major nickel anode was set at 180 mA/cm$^2$. The indium and bismuth minor anodes had current densities of 25 mA/cm$^2$ and 12 mA/cm$^2$, respectively. After an electrodeposition period of 51 min. at room temperature, the zincate concentration decreased to 31 g/L and the process was stopped. The cathode was scraped every 4 minutes throughout the electrodeposition process to remove the deposited dendritic zinc alloy. Stirring was again effected by hydrogen gas evolution.

The resulting dendritic zinc alloy powder particles were very fine, and the concentration of inhibitor metals in the zinc alloy were Pb 860 ppm, In 2600 ppm, Bi 1800 ppm and Ga 60 ppm. The corrosion rate of the dendritic zinc alloy powder particles was 0.03% when measured at 50° C. in a 10 M KOH solution. When the zinc alloy powder was mixed with the organic inhibitor RHODAFAC RA 600, the corrosion rate under the same conditions dropped to 0.001% per week.

Although the invention has been described with reference to preferred embodiments and specific examples, those of ordinary skill in the art will readily appreciate that many modifications and adaptations of the invention are possible without departure from the spirit and scope of the invention as claimed hereinafter.

We claim:

1. A mercury-free corrosion resistant zinc alloy powder comprised of:
   a. a plurality of electrolytically prepared dendritic zinc alloy particles having a surface area between 0.5 and 1.8 m$^2$/g and a bulk density of between 0.5 and 1.3 g/cc; wherein
   b. said zinc alloy comprises zinc as a major alloying element and bismuth as a minor alloying element in a concentration of between about 250 and 2400 ppm, the bismuth being intrinsically alloyed throughout each of said dendritic zinc alloy particles.

2. A mercury-free corrosion resistant zinc alloy powder according to claim 1, wherein said dendritic zinc alloy particles have an average particle size within the range of about 50 to 200 μm.

3. A mercury-free corrosion resistant zinc alloy powder according to claim 1, wherein said zinc alloy further includes at least one additional inhibitor metal intrinsically alloyed therein as a minor alloying element and said at least one additional inhibitor metal is selected from the group consisting of lead, indium, tin and gallium.

4. A mercury-free corrosion resistant zinc alloy powder according to claim 1, wherein said zinc alloy further includes at least one inhibitor metal intrinsically alloyed therein as a minor alloying element and said at least one additional alloying element is selected from the following group and is present in the specified concentration: lead in concentration of about 20 to 2500 ppm, indium in a concentration of about 75 to 3500 ppm, and gallium in a concentration of about 10 to 100 ppm.

5. A mercury-free corrosion resistant zinc alloy powder according to claims 3 or 4, wherein said dendritic zinc alloy powder has a corrosion rate of less than about 0.2% per week at 50° C. in a 10 M KOH solution.

6. A mercury-free corrosion resistant zinc alloy powder according to claims 3 or 4, wherein said dendritic zinc alloy powder has a corrosion rate of less than about 0.1% per week at 50° C. in a 10 M KOH solution.

7. A mercury-free corrosion resistant zinc alloy powder according to claims 3 or 4, wherein said dendritic zinc alloy powder has a corrosion rate of less than about 0.03% per week at 50° C. in a 10 M KOH solution.

8. A mercury-free corrosion resistant zinc alloy powder according to claims 3 or 4, wherein said dendritic zinc alloy powder further comprises an organic inhibitor on the surface of said powder and has a corrosion rate of less than 0.01% per week at 50° C. in a 10 M KOH solution.

9. A mercury-free corrosion resistant zinc alloy powder according to claim 1, wherein said zinc alloy further comprises lead intrinsically alloyed therein in a concentration of about 20 to 2500 ppm.

10. A mercury-free corrosion resistant zinc alloy powder according to claim 9, wherein said zinc alloy further comprises gallium intrinsically alloyed therein in a concentration of about 10 to 100 ppm.

11. A mercury-free corrosion resistant zinc alloy powder according to claim 9, wherein said zinc alloy further comprises indium intrinsically alloyed therein in a concentration of about 250 to 3500 ppm.

12. A mercury-free corrosion resistant zinc alloy powder according to claim 1, wherein said zinc alloy further comprises lead intrinsically alloyed therein in a concentration of about 500 to 1000 ppm.

13. A mercury-free corrosion resistant zinc alloy powder according to claim 1, wherein said zinc alloy further comprises gallium intrinsically alloyed therein in a concentration of about 10 to 100 ppm.

14. A mercury-free corrosion resistant zinc alloy powder according to claim 1, wherein said zinc alloy further comprises indium intrinsically alloyed therein in a concentration of about 250 to 3500 ppm.

15. A mercury-free corrosion resistant zinc alloy powder comprised of:
   a. a plurality of electrolytically prepared dendritic zinc alloy particles having a surface area between 0.5 and 1.8 m$^2$/g and a bulk density of between 0.5 and 1.3 g/cc; wherein
   b. said zinc alloy comprises zinc as a major alloying element and indium in a concentration of between about 250 and 3500 ppm, the indium being intrinsically alloyed throughout each of said dendritic zinc alloy particles.

16. A mercury-free corrosion resistant zinc alloy powder according to claim 15, wherein said dendritic zinc alloy particles have an average particle size within the range of about 50 to 200 μm.

17. A mercury-free corrosion resistant zinc alloy powder according to claim 15, wherein said zinc alloy further includes at least one additional inhibitor metal intrinsically alloyed therein as a minor alloying element and said at least one additional inhibitor metal is selected from the group consisting of lead, bismuth, tin and gallium.

18. A mercury-free corrosion resistant zinc alloy powder according to claim 15, wherein said zinc alloy further includes at least one inhibitor metal intrinsically alloyed therein as a minor alloying element and said at least one additional alloying element is selected from the following group and is present in the specified concentration: lead in concentration of about 20 to 2500 ppm, bismuth in a concentration of about 50 to 2400 ppm, and gallium in a concentration of about 10 to 100 ppm.

19. A mercury-free corrosion resistant zinc alloy powder according to claims 17 or 18, wherein said dendritic zinc alloy powder has a corrosion rate of less than about 0.2% per week at 50° C. in a 10 M KOH solution.

20. A mercury-free corrosion resistant zinc alloy powder according to claims 17 or 18, wherein said dendritic zinc alloy powder has a corrosion rate of less than about 0.1% per week at 50° C. in a 10 M KOH solution.

21. A mercury-free corrosion resistant zinc alloy powder according to claims 17 or 18, wherein said dendritic zinc alloy powder has a corrosion rate of less than about 0.03% per week at 50° C. in a 10 M KOH solution.

22. A mercury-free corrosion resistant zinc alloy powder according to claims 17 or 18, wherein said dendritic zinc alloy powder further comprises an organic inhibitor on the surface of said powder and has a corrosion rate of less than 0.01% per week at 50° C. in a 10 M KOH solution.

23. A mercury-free corrosion resistant zinc alloy powder according to claim 15, wherein said zinc alloy further comprises lead intrinsically alloyed therein in a concentration of about 20 to 2500 ppm.

24. A mercury-free corrosion resistant zinc alloy powder according to claim 23, wherein said zinc alloy further comprises gallium intrinsically alloyed therein in a concentration of about 10 to 100 ppm.

25. A mercury-free corrosion resistant zinc alloy powder according to claim 15, wherein said zinc alloy further comprises lead intrinsically alloyed therein in a concentration of about 500 to 1000 ppm.

26. A mercury-free corrosion resistant zinc alloy powder according to claim 15, wherein said zinc alloy further comprises gallium intrinsically alloyed therein in a concentration of about 10 to 100 ppm.

27. A mercury-free corrosion resistant zinc alloy powder comprised of:
   a. a plurality of electrolytically prepared dendritic zinc alloy particles having a surface area between 0.5 and 1.8 $m^2$/g and a bulk density of between 0.5 and 1.3 g/cc; wherein
   b. said zinc alloy comprises zinc as a major alloying element and lead, indium, bismuth, and gallium as minor alloying elements, wherein lead is present in a concentration of between about 20 and 2500 ppm, indium is present in a concentration of between about 250 and 3500 ppm, bismuth is present in a concentration of between about 50 and 2400 ppm, and gallium is present in a concentration of between about 10 and 100 ppm, the lead, indium, bismuth, and gallium being intrinsically alloyed throughout each of said dendritic zinc alloy particles.

28. A mercury-free corrosion resistant zinc alloy powder according to claim 27, wherein said dendritic zinc alloy particles have a an average particle size within the range of about 50 to 200 μm.

29. A mercury-free corrosion resistant zinc alloy powder according to claim 27, wherein said lead is present in a concentration of between about 500 ppm and 1000 ppm, indium is present in a concentration of between about 250 to 3000 ppm, bismuth is present in a concentration of between about 100 and 2000 ppm, and gallium is present in a concentration of between about 40 and 100 ppm.

30. A mercury-free corrosion resistant zinc alloy powder according to claim 29, wherein said dendritic zinc alloy powder has a corrosion rate of less than about 0.1% per week at 50° C. in a 10 M KOH solution.

31. A mercury-free corrosion resistant zinc alloy powder according to claim 29, wherein said dendritic zinc alloy powder has a corrosion rate of less than about 0.03% per week at 50° C. in a 10 M KOH solution.

32. A mercury-free corrosion resistant zinc alloy powder according to claim 29, wherein said dendritic zinc alloy powder further comprises an organic inhibitor on the surface of said powder and has a corrosion rate of less than 0.01% per week at 50° C. in a 10 M KOH solution.

* * * * *